(12) United States Patent
Grover et al.

(10) Patent No.: US 6,856,592 B2
(45) Date of Patent: Feb. 15, 2005

(54) METHOD OF PROVIDING RESTORATION ROUTES IN A MESH NETWORK

(75) Inventors: Wayne D. Grover, Edmonton (CA); John Doucette, Edmonton (CA); Thuthuy Bach, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 806 days.

(21) Appl. No.: 09/808,173

(22) Filed: Mar. 15, 2001

(65) Prior Publication Data

US 2002/0181393 A1 Dec. 5, 2002

(51) Int. Cl.$^7$ .......................... G01R 31/08; H04L 12/28; H04J 3/16
(52) U.S. Cl. ...................... 370/216; 370/216; 370/400; 370/406; 370/468; 714/4; 340/2.1
(58) Field of Search .................. 370/216, 238, 370/254, 468, 225, 222, 406; 714/4; 707/104, 218, 220, 250; 340/2.1

(56) References Cited

U.S. PATENT DOCUMENTS

| | | | | |
|---|---|---|---|---|
| 5,787,271 A | * | 7/1998 | Box et al. ................... | 395/500 |
| 5,999,103 A | * | 12/1999 | Croslin ................... | 340/825.01 |
| 6,038,044 A | * | 3/2000 | Fee et al. ................... | 359/119 |
| 6,137,775 A | * | 10/2000 | Bartlett et al. .............. | 370/216 |
| 6,421,349 B1 | * | 7/2002 | Grover ....................... | 370/408 |

OTHER PUBLICATIONS

Doucette et al., "Modularity and Economy–of Scale Effects in the Optimal Design of Mesh–Restorable Networks", p. 226–231. 1999 IEEE. Proceedings of the 1999 IEEE Canadian Conference on Electrical and Computer Engineering.*
Herzberg, Meir t al., 'An Optimal Spare–Capacity Assignment Model for Survivable Networks with Hop Limits', Globecom '94, pp. 1–6.
Doucette, John et al., 'Influence of Modularity and Economy–of–scale Effects on Design of Mesh–Restorable DWDM Networks', pp. 1–40.

* cited by examiner

Primary Examiner—Duc Ho

(57) ABSTRACT

A method of providing restoration routes for protecting traffic in a mesh network is described. The method comprises the steps of generating a set of eligible restoration routes for each span in the network, establishing a bi-criteria objective function in terms of route length and capacity cost for selecting a set of restoration routes, and selecting a set of restoration routes for each span from the eligible restoration routes in dependence upon the bi-criteria objective function. Embodiments of the invention may be useful for shortening the lengths, in terms of hops, of existing restoration routes in a mesh-restorable network and in some cases with negligible spare capacity penalty.

13 Claims, 8 Drawing Sheets

METHOD OF PROVIDING RESTORATION ROUTES IN A MESH NETWORK

FIELD OF THE INVENTION

This invention relates to the protection of traffic in a mesh network, and more particularly to providing restoration routes that enable traffic protection.

BACKGROUND OF THE INVENTION

Mesh networks are often implemented in situations involving rapid growth or shifting demand patterns, as these networks offer greater flexibility than other network topologies such as ring networks. Communications networks, whether ring, mesh, or other topologies, can suffer from failures, or service degradations, that affect the flow of traffic from source to destination nodes. In order to mitigate tangible losses arising from these failures and degradations, protection schemes in the form of protection paths, or restoration routes, should be arranged before a failure occurs. These protection schemes provide an alternative means, usually involving physically diverse paths and equipment, for transporting traffic between an origin and destination (O-D) node pair. Mesh networks, in contrast to ring networks, have restoration routes that are much more adaptive and hence are more capable of exploiting spare capacity in the network. However, due to the complexity of a typical mesh network it is difficult to determine the set of restoration routes, for each source and destination node pair, that makes efficient use of spare capacity. Additionally, keeping restoration routes as short as possible is important for signal quality reasons, especially in optical networks.

Therefore, a method of providing restoration routes, in a mesh network, that efficiently exploits spare network capacity and keeps the restoration routes as short as possible is desired.

SUMMARY OF THE INVENTION

It is an object of the present invention to provide an improved method of providing restoration routes in a mesh network.

The method addresses the trade-off between the length of restoration routes, in terms of hops, and spare capacity of network spans that form the restoration routes. A hop represents a connection between two network nodes and is often called a span or link. A restoration route is made up of one or more hops, whereby a communications path between an origin node and a destination node is provided. Networks spans have enough bandwidth capacity, defined in terms of OC-48 (2.5 Gb/s) equivalent links herein, to carry working traffic and have additional spare capacity that is used by the restoration routes to provide traffic protection. The amount of working capacity on any given span is the sum of all traffic demands over every working route that uses that span. Working routes satisfy capacity demands of normal, or average, traffic flows between O-D pairs and may be determined by shortest path routing (e.g. Opened Shortest Path First—OSPF) or other means. Embodiments of the invention offer the advantage of shortening the lengths, in terms of hops, of restoration paths in a mesh-restorable network and in some cases with negligible spare capacity penalty.

According to an aspect of the present invention there is provided a method of determining restoration routes in a mesh network. The mesh network includes a plurality of network nodes interconnected by spans, each span having a predetermined amount of working capacity. The method comprises the steps of generating a set of eligible restoration routes for each span in the network, establishing a bi-criteria objective function in terms of route length and capacity cost for selecting a set of restoration routes, and selecting a set of restoration routes for each span from the eligible restoration routes in dependence upon the bi-criteria objective function. Establishing a bi-criteria objective function in terms of route length and capacity costs allows addressing both of these criteria at one time while selecting the restoration routes.

Conveniently, the step of selecting a set of restoration routes comprises the steps of determining an initial value of an intermediary variable in the bi-criteria objective function for identifying combinations of capacity and length of restoration routes to be selected, selecting the restoration routes for each span according to the bi-criteria objective function, and adjusting the value of the intermediary variable and repeating the selection of restoration routes for each span according to the adjusted bi-criteria objective function until a final value of the intermediary variable is reached. Adjusting the value of the intermediary variable allows for the selection of routes that represent different trade-offs of route length vs. capacity cost.

Conveniently, there are several conditions that can be used to indicate a final value of the intermediary variable has been reached. For example, one condition would be when further decreases in the average restoration route length would require additional capacity on any one of the spans. This condition results in selecting the shortest set of restoration routes that does not incur any additional cost for spare capacity. Alternatively, another condition would be when a knee in a plot of spare capacity cost in the spans versus the average restoration route length occurs. This condition results in selecting a set of restoration routes that requires some additional cost for spare capacity, but not with diminishing returns. Still another condition would be when an asymptote in a plot of spare capacity cost in the spans versus the average restoration route length is reached. This condition results in selecting the shortest the set of restoration routes regardless of additional cost for spare capacity, but without incurring additional cost for spare capacity which has no effect on the length of the restoration routes.

According to another aspect of the present invention there is provided a method of determining network span capacity required for traffic protection in a mesh network comprising:

a) establishing a model describing the network including the interconnection of network nodes and spans, the cost of bandwidth capacity on each span, and the capacity demand between network nodes;

b) determining a working capacity placement on each span;

c) establishing a bi-criteria objective function in terms of route length and span capacity cost;

d) selecting a set of restoration routes for each span in dependence upon the bi-criteria objective function and the model; and e) determining an amount of spare capacity, additional to the working capacity, required for each span in accordance with the selected set of restoration routes.

According to still another aspect of the present invention there is provided a method of providing restoration routes in a mesh network, the network comprising a plurality of network nodes interconnected by spans and having a protection routing control function, the method comprising the steps of:

a) establishing a model describing the network;

b) determining a working capacity placement on each span;

c) generating a set of eligible restoration routes for each span in the network;

d) establishing a bi-criteria objective function in terms of route length and capacity cost for selecting a set of restoration routes from the eligible restoration routes for each span;

e) selecting a set of restoration routes for each span in dependence upon the bi-criteria objective function;

f) determining an amount of spare capacity required for each span in accordance with the set of restoration routes selected for the span;

g) adapting the network to provide the spare capacity required for each span; and h) communicating the set of restoration routes selected for each span to the protection routing control function in the network.

According to yet another aspect of the present invention there is provided a method of providing network span capacity required for traffic protection in a mesh network comprising:

a) establishing a model describing the network including the interconnection of network nodes and spans, the cost of bandwidth capacity on each span, and the capacity demand between network nodes;

b) determining a working capacity placement on each span;

c) establishing a bi-criteria objective function in terms of route length and span capacity cost;

d) selecting a set of restoration routes for each span in dependence upon the bi-criteria objective function and the model; and e) determining an amount of spare capacity, additional to the working capacity, required for each span in accordance with the selected set of restoration routes; and f) adapting the network to provide the spare capacity required for each span.

Other aspects of the invention include combinations and sub combinations of the features described above other than the combinations described above.

BRIEF DESCRIPTION OF THE DRAWINGS

The invention will be further understood from the following detailed description of embodiments of the invention with reference to the accompanying drawings, in which.

DETAILED DESCRIPTION

Figure 1:
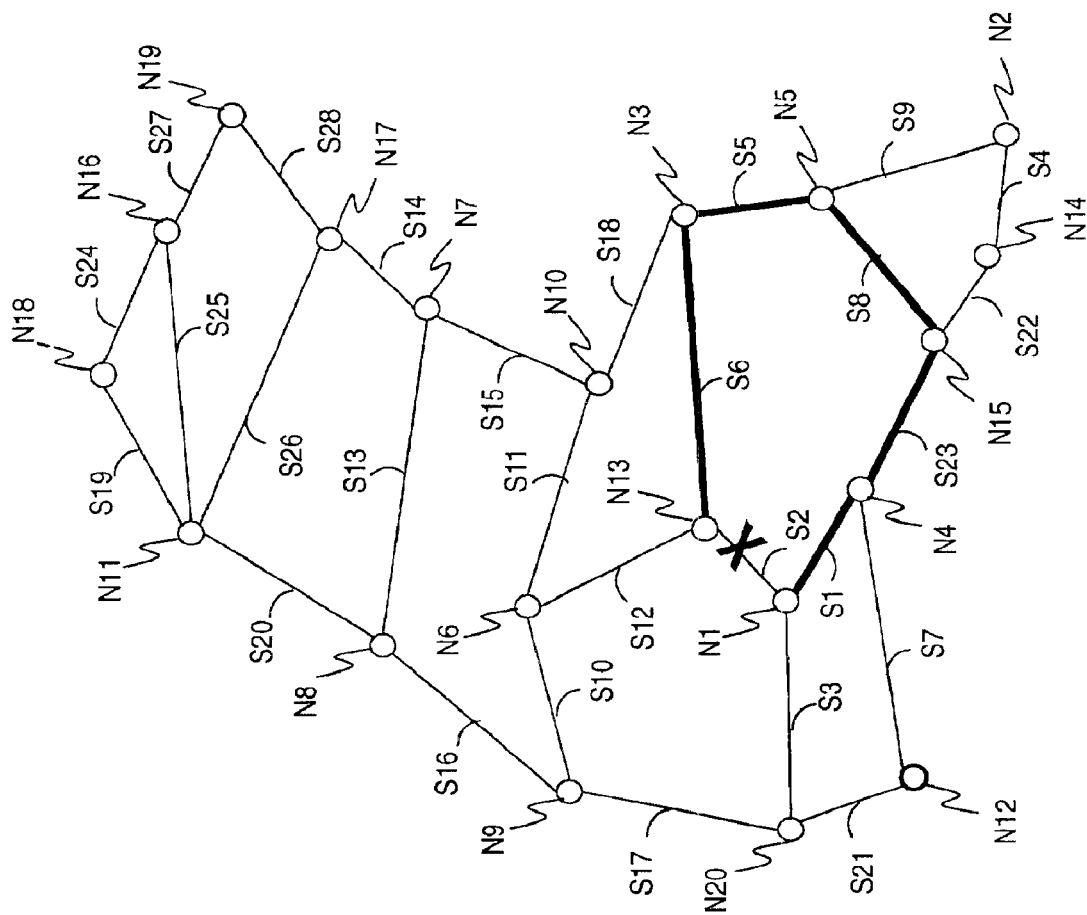
FIG. 1 is a diagram of a mesh network adapted for the provision of restoration routes in accordance with an embodiment of the invention.

Referring to FIG. 1, an example mesh network 2 will be described. This mesh network 2 could represent a long haul dense wavelength division multiplexed (DWDM) optical network for example. The mesh network 2 consists of twenty nodes, labelled N1 to N20, and twenty-eight spans, labelled S1 to S28, interconnecting the nodes according to Table 1, below. Table 1 lists, for each span: the two nodes which the span interconnects, the length of the span, the cost of the span, the working capacity of the span, and the spare capacity required of the span determined in accordance with an embodiment of the invention when alpha (an intermediary variable of the bi-criteria objective function) equals 200. The total capacity of a particular span equals the working capacity plus the spare capacity of that span. The network nodes could be WDM optical cross connect (OXC) network nodes, for example, and the spans could be DWDM links carried on standard single mode optical fiber (SSMF). In FIG. 1, a failure is shown by an "X" in the span S2, which interconnects nodes N1 and N13. A restoration route for providing protection of traffic between the nodes N1 and N13 is shown in bold. The restoration route, from node N1 to node N13, consists of the spans S1, S23, S8, S5, and S6. Spare capacity must exist on these spans in order to provide protection for the traffic normally carried over the failed span S2.

TABLE 1

Network Nodes and Spans

| Span | Node A | Node B | Length (Km) | Cost ($/OC-48 equivalent) | Working Capacity (OC-48 equivalents) | Spare Capacity (OC-48 equivalents) at α = 200 |
|---|---|---|---|---|---|---|
| S1 | N1 | N4 | 418 | 26125 | 88 | 370 |
| S2 | N1 | N13 | 484 | 30250 | 156 | 370 |
| S3 | N1 | N20 | 1048 | 65500 | 60 | 156 |
| S4 | N2 | N14 | 395 | 24687 | 56 | 366 |
| S5 | N3 | N5 | 763 | 47687 | 370 | 70 |
| S6 | N3 | N13 | 848 | 53000 | 82 | 398 |
| S7 | N4 | N12 | 1345 | 84062 | 34 | 88 |
| S8 | N5 | N15 | 863 | 53937 | 290 | 370 |
| S9 | N5 | N2 | 1264 | 79000 | 40 | 366 |
| S10 | N6 | N9 | 455 | 28437 | 170 | 348 |
| S11 | N6 | N10 | 1064 | 66500 | 132 | 398 |
| S12 | N6 | N13 | 1610 | 100625 | 76 | 398 |
| S13 | N7 | N8 | 1223 | 76437 | 14 | 348 |
| S14 | N7 | N17 | 942 | 58875 | 342 | 208 |
| S15 | N7 | N10 | 1034 | 64625 | 348 | 90 |
| S16 | N8 | N9 | 1450 | 90625 | 90 | 348 |
| S17 | N9 | N20 | 1780 | 111250 | 30 | 156 |
| S18 | N10 | N3 | 837 | 52312 | 398 | 132 |
| S19 | N11 | N18 | 867 | 54187 | 184 | 96 |
| S20 | N11 | N8 | 1662 | 103875 | 90 | 342 |
| S21 | N12 | N20 | 459 | 28687 | 76 | 88 |
| S22 | N14 | N15 | 130 | 8125 | 366 | 290 |
| S23 | N15 | N4 | 1121 | 70062 | 70 | 370 |
| S24 | N16 | N18 | 160 | 10000 | 96 | 184 |
| S25 | N16 | N11 | 1107 | 69187 | 0 | 184 |
| S26 | N17 | N11 | 1244 | 77750 | 240 | 342 |
| S27 | N19 | N16 | 1463 | 91437 | 32 | 92 |
| S28 | N19 | N17 | 1868 | 116750 | 92 | 32 |

Figure 2:
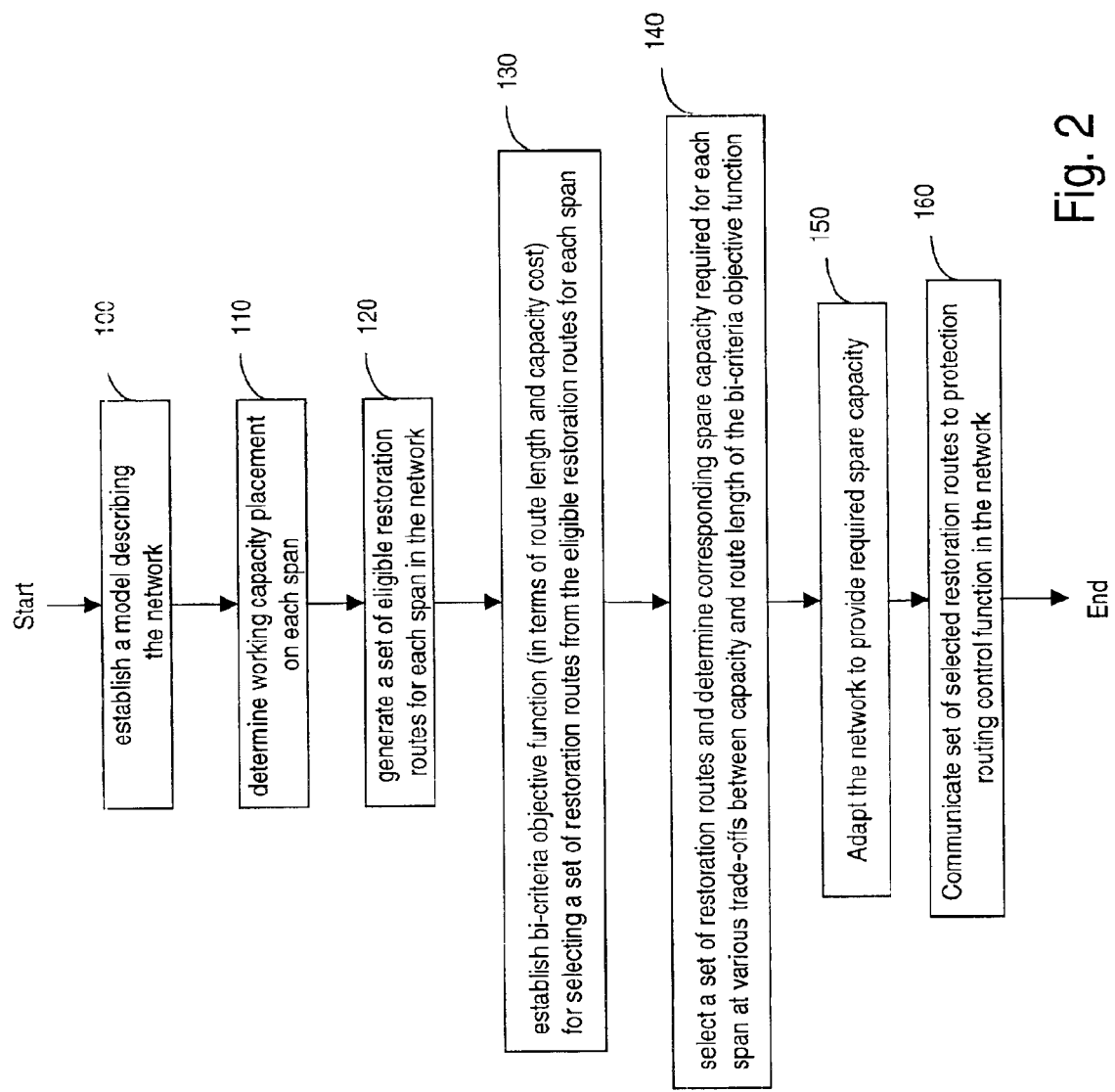
FIG. 2 is a flowchart of a method of providing restoration routes in accordance the embodiment of FIG. 1.

Referring to FIG. 2, a method of providing restoration routes in accordance with an embodiment of the invention will be described. The method will be described in general first, and particular sections described in more detail later, as required. The first step (100) is to establish a model describing the network. This model includes a description of the network topology, point-to-point capacity demands between nodes of the network, and the cost of capacity provided by the spans. The next step (110) is to determine the working capacity (i.e. the capacity required to satisfy the point-to-point capacity demands) placement on each span. This determination is dependent on the working path routing, which can be generated using several methods known in the art, for example, opened shortest path first (OSPF) routing. The next step (120) is to generate a set of eligible restoration routes for the network. The next step (130) is to establish a bi-criteria objective function, in terms of route length and capacity cost, for selecting restoration routes from the eligible restoration routes. The next step (140) is to select, for each span, a set of restoration routes from the set of eligible restoration routes and determine the corresponding spare capacity required on each span in the selected set at various trade-offs between capacity and route length of the bi-criteria objective function. The next step (150) is to adapt the network to provide required spare capacity on each span as determined in the previous step (140). This adaptation of the network could comprise any or all of the following: adding additional fibers in the corresponding transmit-receive pairs to the spans, increasing the transmission rate of the spans, or adding additional channels (e.g. in the case of a DWDM links) to the spans. The final step (160) is to communicate the set of selected restoration routes to a protection routing control function in the network. This protection routing control function could be a centralized controller, or it could be a distributed function that resides in one or more of the network nodes (e.g. in the routing tables of the network nodes).

The step (100) of establishing a model describing the network will now be described in more detail with reference to the mesh network 2 of FIG. 1. The mesh network 2 has twenty nodes and twenty-eight spans with 148 non-zero origin-destination (O-D) pairs exchanging an average of 7.43 OC-48 equivalents of bandwidth (i.e. 2.5 Gb/s) each. Table 1 shows the interconnection of the nodes (N1–N20) via the spans (S1–S28) and their corresponding span lengths. Span lengths range from 100 to ~1900 km and are used to distance-weight the spare capacity cost in the optimizations. The cost of capacity (working or spare) is $62.50 per OC-48 equivalent, per kilometer. The total capacity cost per OC48 equivalent for each span is given in the "cost" column of Table 1. The "working capacity" column of Table 1 gives the amount of working capacity (in OC-48 equivalents) on each span required to support the working capacity demand between O-D pairs. Individual demand quantities between O-D pairs range from 2 to 88 OC-48 equivalents. These demand quantities are given in Table 2, below.

TABLE 2

Node-to-Node Capacity Demand (in OC48 equivalents)

|  | N1 | N2 | N3 | N4 | N5 | N6 | N7 | N8 | N9 | N10 | N11 | N12 | N13 | N14 | N15 | N16 | N17 | N18 | N19 | N20 |
|---|---|---|---|---|---|---|---|---|---|---|---|---|---|---|---|---|---|---|---|---|
| N1 | — | | | | | | | | | | | | | | | | | | | |
| N2 | 2 | — | | | | | | | | | | | | | | | | | | |
| N3 | 6 | 14 | — | | | | | | | | | | | | | | | | | |
| N4 | 22 | 0 | 2 | — | | | | | | | | | | | | | | | | |
| N5 | 4 | 8 | 22 | 0 | — | | | | | | | | | | | | | | | |
| N6 | 36 | 4 | 14 | 2 | 8 | — | | | | | | | | | | | | | | |
| N7 | 2 | 2 | 20 | 0 | 4 | 6 | — | | | | | | | | | | | | | |
| N8 | 0 | 0 | 0 | 0 | 0 | 2 | 6 | — | | | | | | | | | | | | |
| N9 | 34 | 2 | 16 | 2 | 6 | 36 | 2 | 10 | — | | | | | | | | | | | |
| N10 | 2 | 2 | 14 | 0 | 6 | 8 | 36 | 0 | 14 | — | | | | | | | | | | |
| N11 | 4 | 2 | 4 | 0 | 8 | 34 | 8 | 12 | 26 | 8 | — | | | | | | | | | |
| N12 | 22 | 2 | 4 | 4 | 0 | 2 | 34 | 0 | 2 | 0 | 0 | — | | | | | | | | |
| N13 | 6 | 2 | 16 | 14 | 2 | 0 | 2 | 0 | 2 | 2 | 2 | 0 | — | | | | | | | |
| N14 | 20 | 46 | 88 | 2 | 30 | 30 | 0 | 0 | 4 | 2 | 88 | 26 | 2 | — | | | | | | |
| N15 | 2 | 2 | 2 | 2 | 4 | 2 | 30 | 0 | 2 | 2 | 2 | 2 | 2 | 34 | — | | | | | |
| N16 | 2 | 2 | 2 | 2 | 6 | 2 | 2 | 0 | 2 | 2 | 16 | 0 | 2 | 2 | 2 | — | | | | |
| N17 | 0 | 0 | 2 | 4 | 0 | 2 | 0 | 0 | 0 | 4 | 0 | 0 | 0 | 0 | 4 | 0 | — | | | |
| N18 | 2 | 2 | 22 | 0 | 2 | 2 | 0 | 0 | 2 | 12 | 46 | 6 | 0 | 18 | 0 | 20 | 2 | — | | |
| N19 | 2 | 2 | 32 | 2 | 8 | 12 | 2 | 0 | 2 | 2 | 10 | 0 | 2 | 4 | 2 | 10 | 4 | 12 | — | |
| N20 | 8 | 2 | 2 | 2 | 6 | 6 | 12 | 0 | 10 | 2 | 2 | 38 | 2 | 2 | 2 | 2 | 0 | 0 | 2 | — |

In the step (110) of determining the working capacity placement on each span, shortest path routing (e.g. OSPF) was first used to determine the routing of the working paths between the 148 non-zero O-D pairs of nodes. Then for each O-D pair of nodes, the amount of demand shown in Table 2 was placed on the shortest paths according to the distance in kilometers, not hops. If there were multiple equal-length shortest paths between a particular O-D pair of nodes, then the demand was divided equally between those paths. After the working path capacity demands were placed, the total working capacity on each span (S1–S28) was determined by summing the working capacity placed on the span over all the working paths. The "working capacity" column in Table 1 shows this capacity on each span in OC-48 equivalent links.

It should be noted it is only the working capacity of each span that is required by the present method. Once the working capacity of each span has been determined, the actual working routes are not required because further steps of the method use only the working capacities of the spans. In some cases, a model of the mesh network, including the working capacities of the spans, may be initially provided to the method, and the remaining steps of generating eligible restoration routes and selecting routes from that set in accordance with an established bi-criteria objective function are all that is required to give the desired result of determining restoration routes.

In the step (120) of generating a set of eligible restoration routes for each span failure, a set of restoration routes was generated such that there were at least 20 eligible restoration routes for each span failure. The set for each span includes all restoration routes up to a particular hop limit. In the main, the restoration routes selected as a result of the bi-criteria (LP/IP) approach had significantly less hops than the maximum hop limit used. Over all, single-span failure scenarios produced a sample size of 4022 individual eligible restoration routes. These routes are too numerous to include herein, and at any rate, depend on the topology of the network and the maximum hop limit used. The generation of restoration routes under the constraint of hop limits is well known in the art. For example, this topic is dealt with in a paper entitled "An Optimal Spare-capacity Assignment Model for Survival Networks with Hop Limits" published in IEEE GLOBECOM '94 Proceedings (1994), pp. 1601–1607 by M. Herzberg.

Referring again to the step (130) of establishing the bi-criteria objective function, a modelling programming language (AMPL™) model for network design was used to describe the bi-criteria objective function. This model is the integer programming description used in the next step (140) of the present embodiment of the method. A bi-criteria linear programming (LP) or integer programming (IP) formulation is one that expresses two criteria that are of interest in a preferred design. In the present embodiment, a criterion that the total of restoration path hop-lengths should be as small as possible was added to the usual goal of minimizing the spare capacity required for 100% restorability of all span failures. Specifically, the two criteria are described and related to each other by the following objective function:

$$\text{Minimize} \sum_j c_j \cdot l_j \cdot s_j + \alpha \sum_{i,j,p: i \neq j} \delta^p_{i,j} f^p_i \quad (1)$$

where $c_j$ is the cost of a unit distance—capacity, $l_j$ is the length of span j, $s_j$ is the amount of spare capacity required on span j, and p indexes all distinct eligible restoration routes. The "cost" column of Table 1 gives the value of $c_j$ times $l_j$ for each span. The parameter $\delta^p_{i,j}$ is an indicator parameter which is 1 if the $p^{th}$ eligible route for span i uses span j, zero otherwise. The sum of indicator parameters $\delta^p_{i,j}$ for a given span failure i over all other spans j, measures the number of hops in the restoration route p. By weighting this measure with the amount of restoration flow $f^p_i$ assigned to route p when span i fails—which is solved for in the formulation—the total number of hops used by all restoration paths over all failure scenarios is obtained. The number of cross-connections is one greater per path than the number of hops, however, for simplicity the total hops is used as optimization parameter in this case. Alpha ($\alpha$) is an arbitrary weighting factor that blends the two criteria (i.e. span capacity cost in dollars and restoration route path length in hops) in the objective function, placing more or less importance on the path-length relative to the capacity cost. Note that $\alpha$ is simply an intermediary variable to permit identification of all the "Pareto-optimal" combinations of capacity and route-length that are feasible.

The bi-criteria objective function is subject to two constraint systems:

$$\sum_p f^p_i = w_i \quad \forall\, i \in S \quad (2)$$

$$s_j \geq \sum_p \delta^p_{i,j} \cdot f^p_i \quad \forall\, (i, j) \in S^2 \quad i \neq j \quad (3)$$

where S is the set of all network spans. The first constraint asserts that the total restoration flow for each failure scenario must meet the required level of working capacity replacement. The second constraint ensures that every span has sufficient spare capacity to support the largest of the restoration flows imposed upon it over all failure scenarios. The common unit of provisioning both working and spare capacity, and demands, for the present embodiment is assumed to be a 2.5 Gb/s (OC-48) channel. The working span capacities, $w_i$, (from the "working capacity" column of Table 1) are inputs to the formulation, generated by shortest-path mapping of the demand matrix over the graph topology. The restoration flow assignment quantities $f^P_i$ are the primary variables being solved. The spare capacities $s_j$ are generated as a consequence of the restoration flow assignments made to the distinct eligible routes over which restoration is possible.

The following is the listing of the AMPL model (comments start with a "#"):

AMPL Model Listing

```
# Capacity-Speed Bi-Criteria Network Optimization
# SETS
set SPANS;
    # Set of all spans.
set REST_ROUTES{i in SPANS};
    # Set of all restoration routes for each span failure i.
# PARAMETERS
param Cost{j in SPANS};
    # Cost of each module of type m on span j.
param Work{j in SPANS};
    # Number of working links placed on span j.
param DeltaRestRoute{i in SPANS, j in SPANS, p in REST_ROUTES[i]};
    # Equal to 1 if pth restoration route for failure of span i uses span j, 0 otherwise.
param Alpha;
    # Coefficient relating Restoration Time to Capacity/Cost
# VARIABLES
var rest_flow{i in SPANS, p in REST_ROUTES[i]}>=0, <= 1000 integer;
    # Restoration flow through pth restoration route for failure of span i.
var spare{j in SPANS}>=0, <= 1000 integer;
    # Number of spare links placed on span j.
# OBJECTIVE FUNCTION
minimize SpeedCapacityMetric:
Alpha * (sum{i in SPANS, j in SPANS, p in REST_ROUTES[i]: i <> j}
DeltaRestRoute[i,j,p] * rest_flow[i,p])
```

-continued

```
+ (sum{j in SPANS} Cost[j] * spare[j]);
# CONSTRAINTS
subject to Restoration{i in SPANS}:
sum{p in REST_ROUTES[i]} rest_flow[i,p] = Work[i];
    # Each span failure is fully restorable.
subject to SpareCapacityAssignment{i in SPANS, j in SPANS: i <>j}:
spare[j] >= sum{p in REST_ROUTES[i]} DeltaRestRoute[i,j,p] * rest_flow[i,p];
    # Sufficient spare capacity exists on each span to accommodate any
restoration flows routed over it.
End of listing
```

In the step (140) of selecting a set of restoration routes for each span and determining the spare capacity, a range of 17 α values ranging from zero to 1000 was used. It was verified that at any α>200 the solution was identical to that obtained if the first criterion (i.e. capacity cost) was totally removed. Thus, a range of capacity designs was obtained varying from 100% emphasis on minimum capacity concerns, to 100% emphasis on path shortness.

Figure 3:
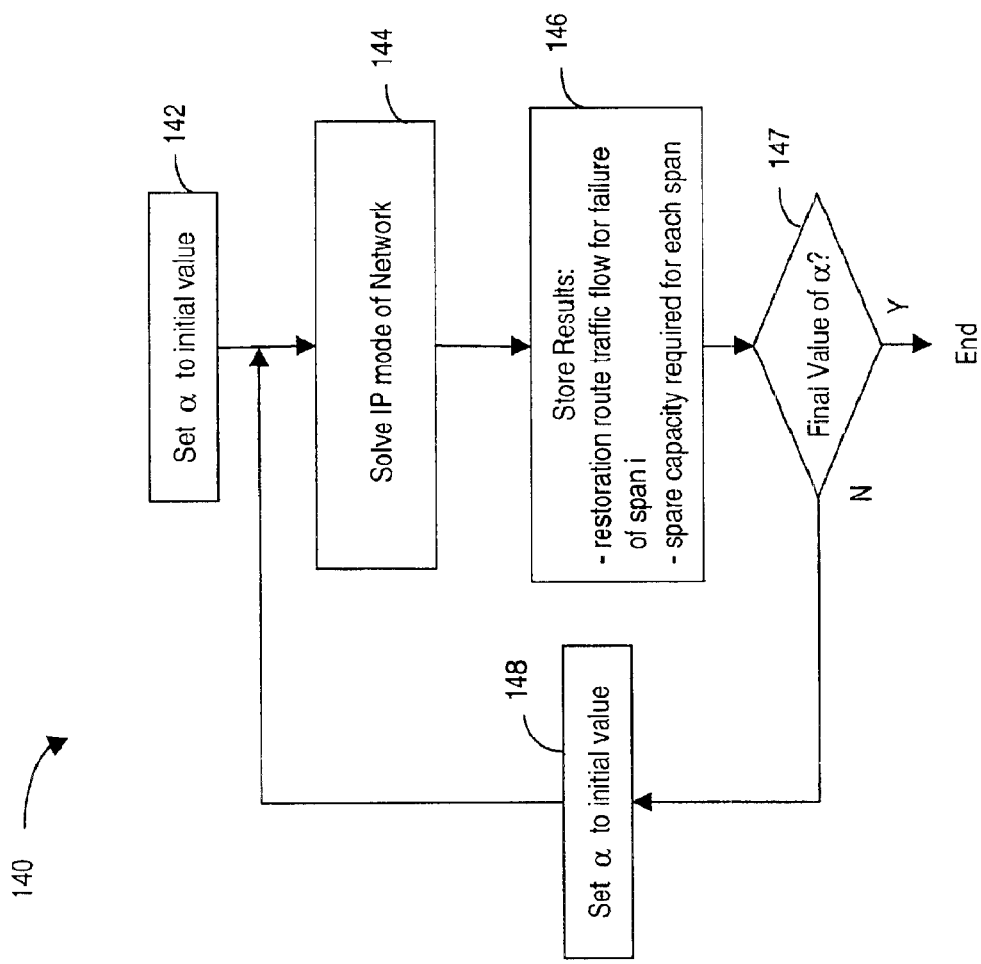
FIG. 3 is a flowchart detailing the step in FIG. 2 of determining restoration route traffic flow and spare span capacity required for the routes.

Referring to FIG. 3, the step 140 of selecting a set of restoration routes and determining the spare capacity required for each span failure will be described in more detail. An initial value for α (e.g. α=0.1) is set in step 142. In the next step (144) the bi-criteria formulation implemented in AMPL and established in the step 120 is solved using linear/integer programming. In this case, the ILOG CPLEX Mixed Integer Optimizer™ was used, however any other suitable IP/LP solver program could be used. This step was done by generating an AMPL data file that describes the network as to be interpreted by the bi-criteria network design AMPL model. In the present embodiment, this data file was created by manually copying into a text file the set of span names, the set of restoration route names, the restoration route descriptions, the span costs, the working capacities generated in the step 110, and the current value of α being used. The data file is then read into AMPL and solved by the CPLEX Solver. The resulting solution describes the optimal restoration routing for the given network using the bi-criteria method. A set of variables called rest_flow[i, p] corresponds to each restoration route such that their values are equal to the amount of restoration traffic flowing through restoration route p for failure of span i. If a rest_flow variable's value is zero, then that route is not used at all. Another set of variables called spare[j] gives the amount of spare capacity the designer must place on each span in the network. The sets of variables rest_flow[i, p] and spare[j] for the particular value of α are stored in step 146. The values for these variables are not included herein for the sake of brevity, since there are over 600 variables for each value of alpha. The exact values depend on the network, working capacities and capacity costs of the spans, and could be obtained for this example using the data in Tables 1 and 2, the AMPL listing and the CPLEX Solver program previously mentioned.

A determination is made in the next step (147) whether the value of α is the final value for the method. For example, this determination could be based on a predetermined range of α (e.g. 0 to 1000), or on whether or not the mean path length is approaching an asymptote that represents a minimum mean path length, as will be explained later with reference to FIG. 7 and for α>200. Responsive to value of α not being the final value, the value of α is incremented in the next step (148) and the method proceeds from the step 144 of solving the bi-criteria formulation. Otherwise, if the value of α is the final value then method ends.

An example of restoration routes provided by the method with ?α=200 is provided in Table 3. In Table 3, the "Route" column gives the name of the restoration route; the "Failure" column gives the span failure for which this restoration route restores traffic; the "Length" column gives the length of this route in hops; the "distance" column gives the length of this route in kilometers; the "Capacity" column gives the amount of restoration flow (in OC-48 equivalents) on the route; and the "Spans" column gives the list of spans used for the route. Note that two restoration routes (RR204 and RR210) are provided for a failure in span S10 since the lengths of the restoration routes RR204 and RR210 are equal. A similar case exists for the span S26.

TABLE 3

Restoration Routes for α = 200

| Route | Failure | Length | Distance | Capacity | Spans |
|---|---|---|---|---|---|
| RR20 | S1 | 3 | 179 | 88 | S3 S7 S21 |
| RR33 | S2 | 4 | 306 | 156 | S3 S10 S12 S17 |
| RR44 | S3 | 3 | 139 | 60 | S1 S7 S21 |
| RR86 | S4 | 3 | 141 | 56 | S8 S9 S22 |
| RR102 | S5 | 5 | 233 | 370 | S1 S2 S6 S8 S23 |
| RR124 | S6 | 3 | 220 | 82 | S11 S12 S18 |
| RR140 | S7 | 3 | 121 | 34 | S1 S3 S21 |
| RR154 | S8 | 3 | 112 | 290 | S4 S9 S22 |
| RR197 | S9 | 3 | 87 | 40 | S4 S8 S22 |
| RR204 | S10 | 4 | 299 | 90 | S11 S13 S15 S16 |
| RR210 | S10 | 4 | 308 | 80 | S2 S3 S12 S17 |
| RR239 | S11 | 3 | 206 | 132 | S6 S12 S18 |
| RR255 | S12 | 3 | 172 | 76 | S6 S11 S18 |
| RR280 | S13 | 3 | 241 | 14 | S14 S20 S26 |
| RR284 | S14 | 3 | 258 | 342 | S13 S20 S26 |
| RR303 | S15 | 4 | 262 | 348 | S10 S11 S13 S16 |
| RR338 | S16 | 4 | 236 | 90 | S10 S11 S13 S15 |
| RR364 | S17 | 4 | 225 | 30 | S2 S3 S10 S12 |
| RR387 | S18 | 3 | 221 | 398 | S6 S11 S12 |
| RR422 | S19 | 2 | 79 | 184 | S24 S25 |
| RR429 | S20 | 3 | 213 | 90 | S13 S14 S26 |
| RR450 | S21 | 3 | 176 | 76 | S1 S3 S7 |
| RR485 | S22 | 3 | 158 | 366 | S4 S8 S9 |
| RR495 | S23 | 5 | 211 | 70 | S1 S2 S5 S6 S8 |
| RR511 | S24 | 2 | 123 | 96 | S19 S25 |
| RR551 | S26 | 3 | 239 | 208 | S13 S14 S20 |
| RR569 | S26 | 3 | 277 | 32 | S25 S27 S28 |
| RR590 | S27 | 3 | 264 | 32 | S25 S26 S28 |
| RR602 | S28 | 3 | 238 | 92 | S25 S26 S27 |

Figure 4:
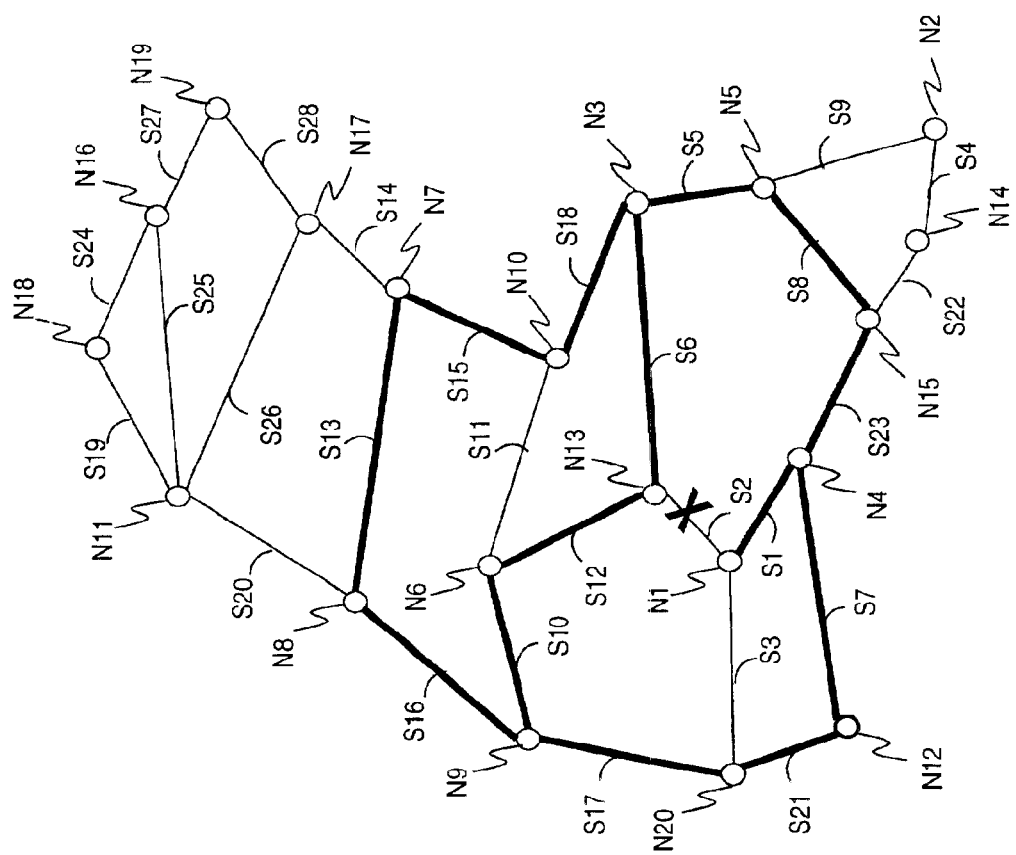
FIG. 4 is a diagram of the mesh network of FIG. 1 showing possible restoration routes for α equal to zero.
Figure 5:
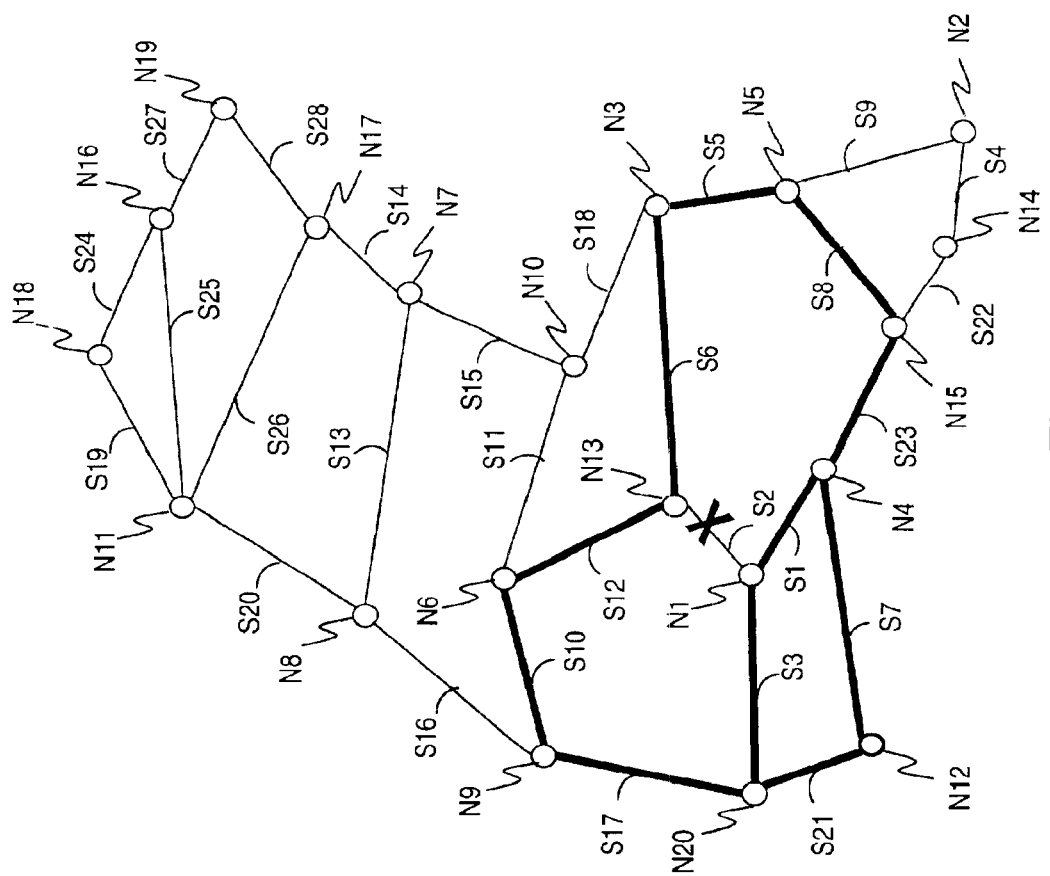
FIG. 5 to the diagram the mesh network of FIG. 1 showing possible restoration routes for α equal to five.
Figure 6:
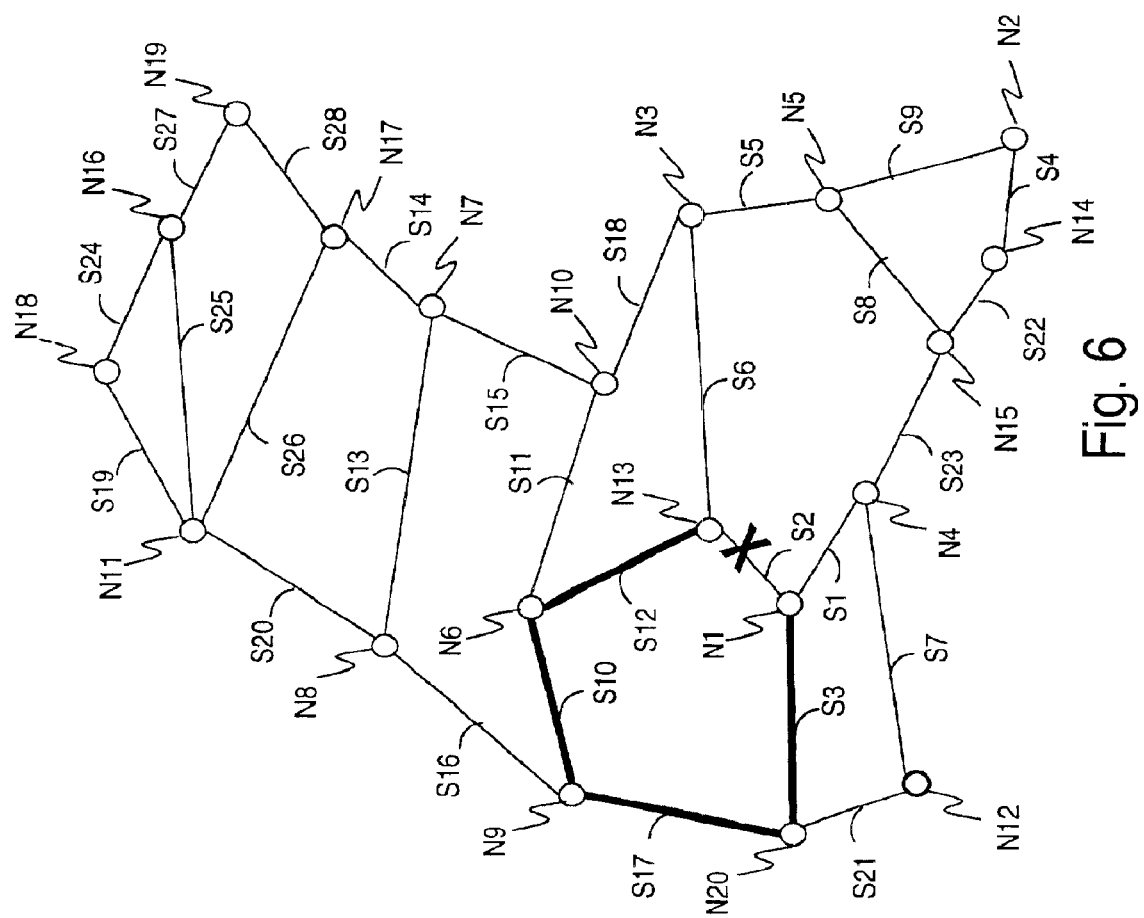
FIG. 6 is a diagram of the mesh network of FIG. 1 showing a restoration route for α greater than or equal to 200.

FIGS. 4 to 6, show a progression of actual restoration route-sets for one particular span failure, span S2, under α=0, 5, and 200, respectively. The figures portray a typical mesh restoration path-set in FIG. 4 (α=0), and how it is easily reduced to the set in FIG. 5 (α=5) with negligible extra capacity on the restoration routes, and finally minimized to the set in FIG. 6 (α=200), by addition of further capacity under bi-criteria design. In the limit that was reached (i.e. α>200), each failure scenario was fully restored by restoration flow on the single shortest alternate route around the failed span. The spare capacity required on each span for α=200 is given in the spare capacity column of Table 1. The total capacity of a particular span equals the working capacity plus the spare capacity of that span.

Figure 7:
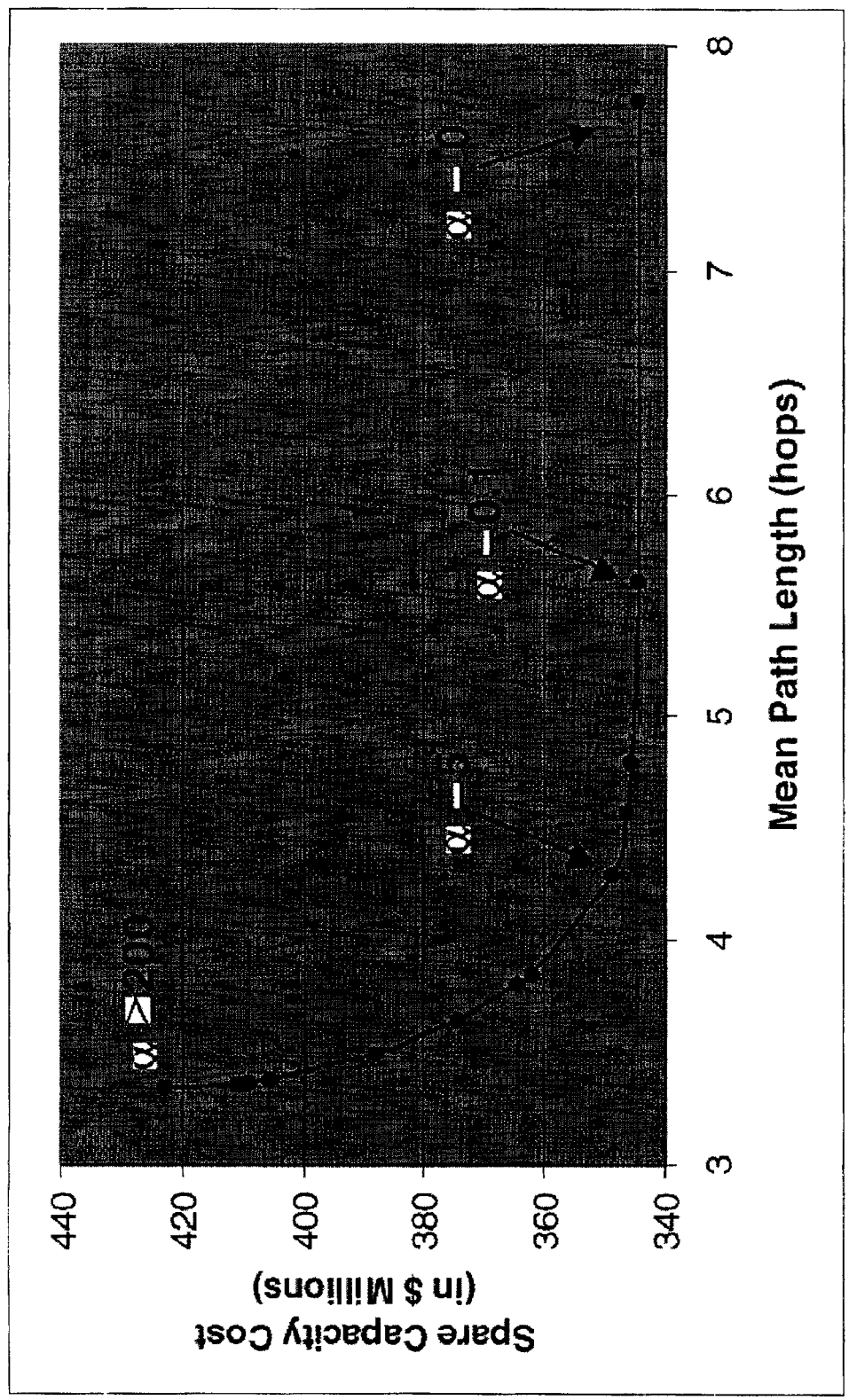
FIG. 7 is a graph of spare capacity cost vs. mean path length in hops for various values of α.

FIG. 7 displays the total cost of spare capacity versus the average number of hops per restoration path for various in values of α. The curve can be interpreted as showing that restoration path lengths can be halved from nearly eight (7.8) to somewhat less than 4.3 hops on average (at α=5) with an almost negligible (0.36%) addition of spare capacity, if placed optimally. On the other hand, to reduce hop lengths further, from 4.3 to 3.4, requires an investment of about 21% more in spare capacity. Finally, the asymptotic relationship of the curve as α approaches 200, shows that 100% restoration is not feasible in this network if fewer than 3.4 hops on average were required in the restoration paths. An interesting further observation is that between α–0 and α=0.1 there is a significant tightening of restoration paths (by 2.1 hops on the average) at no additional cost. Simply by including a criterion that addresses restoration path length in the bi-criteria formulation the average restoration path length is reduced from 7.8 to 5.6 hops. With just the slightest non-zero emphasis on this consideration (i.e. α<>0), the present method is able to provide significantly shorter restoration routes.

Figure 8:
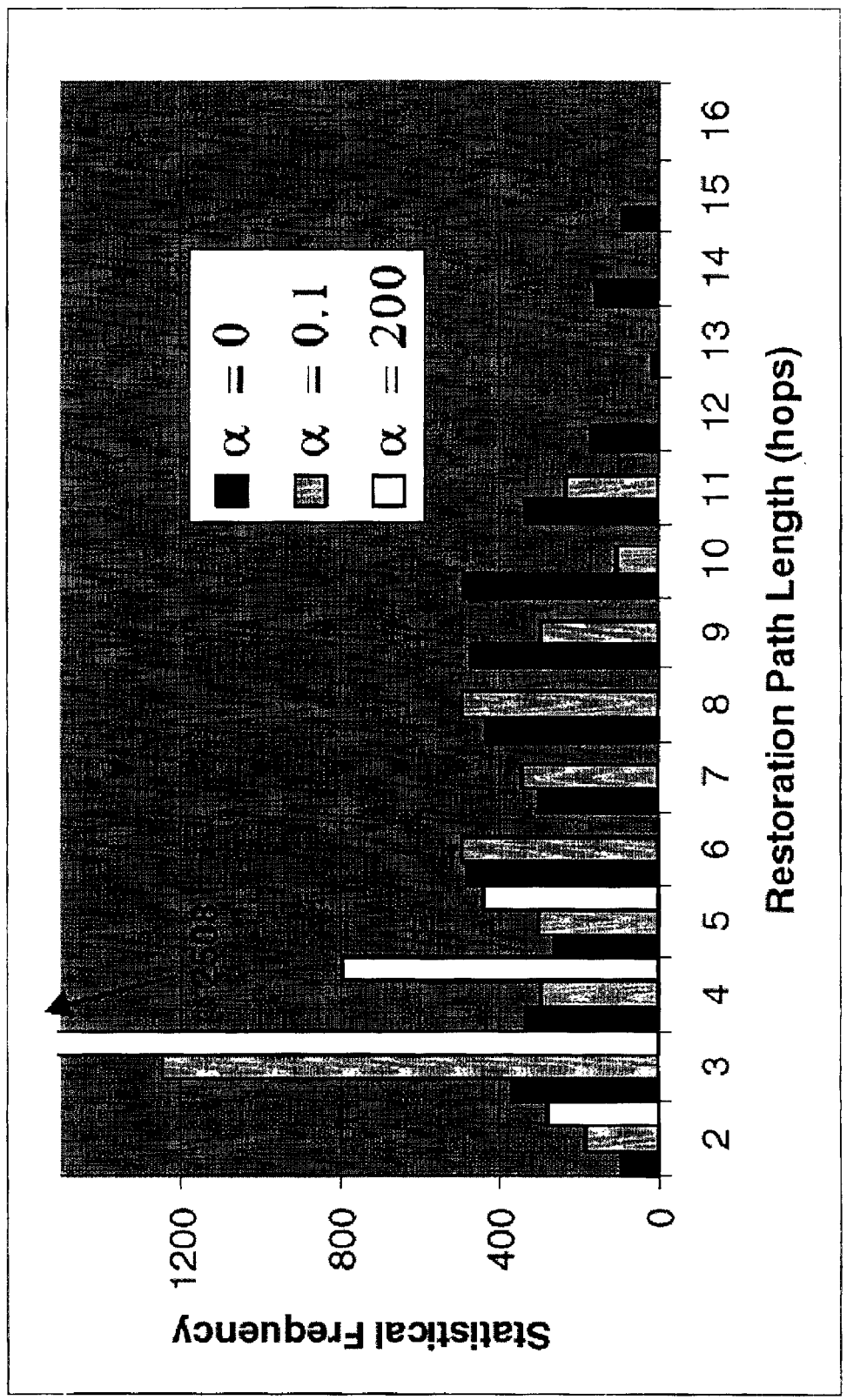
FIG. 8 is a histogram of restoration path length in hops for various values of α.

FIG. 8 is a histogram of restoration path length (in hops) showing that the longest path lengths are eliminated under the bi-criteria constraint to consider path lengths. At α=0, lengths are roughly normal in distribution including several paths up to 15 hops in length. When a is increased even slightly, alternatives to the long routes are easily found. For example, when α is increased from 0 to 0.1, routes with 12 or more hops are eliminated. As α increases further, shorter and shorter restoration routes are adopted.

Numerous alterations, variations and adaptations to the embodiments of the invention described above are possible within the scope of the invention, which is defined by the claims.

What is claimed is:

1. A method of determining restoration routes in a mesh network, the network comprising a plurality of network nodes Interconnected by spans and each span having a predetermined amount of working capacity, the method comprising the steps of:

a) generating a set of eligible restoration routes for each span in the network;
    b) establishing a bi-criteria objective function in terms of route length and capacity cost for selecting a set of restoration routes; and
    c) selecting a set of restoration routes for each span from the eligible restoration routes in dependence upon the bi-criteria objective function wherein the step (c) of selecting a set of restoration routes comprises:
        determining an initial value of an intermediary variable in the bi-criteria objective function for identifying combinations of capacity and length of restoration routes to be selected;
        selecting the restoration routes for each span according to the bi-criteria objective function; and
        adjusting the value of the intermediary variable and repeating the selection of restoration routes for each span according to the adjusted bi-criteria objective function until a final value of the intermediary variable is reached.

2. The method of claim 1 wherein the final value of the intermediary variable is reached when further decreases in the average restoration route length require additional capacity on any one of the spans.

3. The method of claim 1 wherein the final value of the intermediary variable is reached when a knee in a plot of spare capacity cost in the spans versus the average restoration route length is reached.

4. The method of claim 1 wherein the final value of the intermediary variable is reached when an asymptote in a plot of spare capacity cost in the spans versus the average restoration route length is reached.

5. A method of determining network span capacity required for traffic protection in a mesh network comprising:

a) establishing a model describing the network including the interconnection of network nodes and spans, the cost of bandwidth capacity on each span, and the capacity demand between network nodes;
    b) determining a working capacity placement on each span;
    c) establishing a bi-criteria objective function in terms of route length and span capacity cost;
    d) selecting a set of restoration routes for each span in dependence upon the bi-criteria objective function and the model; and
    e) determining an amount of spare capacity, additional to the working capacity, required for each span in accordance with the selected set of restoration routes.

6. The method of claim 5 wherein the step (d) of selecting a set of restoration routes comprises:

determining an initial value of an intermediary variable in the bi-criteria objective function for identifying combinations of capacity and length of restoration routes to be selected;
    selecting the restoration routes for each span according to the bi-criteria objective function; and
    adjusting the value of the intermediary variable and repeating the selection of restoration routes for each span according to the adjusted bi-criteria objective function until a final value of the intermediary variable is reached.

7. The method of claim 6 wherein the final value of the intermediary variable is reached when further decreases in the average restoration route length require additional capacity on any one of the spans.

8. The method of claim 6 wherein the final value of the intermediary variable is reached when a knee in a plot of spare capacity cost in the spans versus the average restoration route length is reached.

9. The method of claim 6 wherein the final value of the intermediary variable is reached when an asymptote in a plot of spare capacity cost in the spans versus the average restoration route length is reached.

10. A method of providing restoration routes in a mesh network, the network comprising a plurality of network nodes interconnected by spans and having a protection routing control function, the method comprising the steps of:

a) establishing a model describing the network;
    b) determining a working capacity placement on each span;
    c) generating a set of eligible restoration routes for each span in the network;
    d) establishing a bi-criteria objective function in terms of route length and capacity cost for selecting a set of restoration routes from the eligible restoration routes for each span;
    e) selecting a set of restoration routes for each span in dependence upon the bi-criteria objective function;
    f) determining an amount of spare capacity required for each span in accordance with the set of restoration routes selected for the span;

g) adapting the network to provide the spare capacity required for each span; and h) communicating the set of restoration routes selected for each span to the protection routing control function in the network.

11. The method of claim 10 wherein the step (a) of establishing a model comprises:

establishing the interconnection of network nodes and spans;

determining the cost of capacity of each span of the network; and determining the capacity demand between the network nodes.

12. The method of claim 11 wherein the step (e) of selecting a set of restoration routes comprises:

determining an initial value of an intermediary variable in the bi-criteria objective function for identifying combinations of capacity and length of restoration routes to be selected;

selecting the restoration routes for each span according to the bi-criteria objective function; and adjusting the value of the intermediary variable and repeating the selection of restoration routes for each span according to the adjusted bi-criteria objective function until a final value of the intermediary variable is reached.

13. A method of providing network span capacity required for traffic protection in a mesh network comprising;

a) establishing a model describing the network including the interconnection of network nodes and spans, the cost of bandwidth capacity on each span, and the capacity demand between network nodes;

b) determining a working capacity placement on each span;

c) establishing a bi-criteria objective function in terms of route length and span capacity cost;

d) selecting a set of restoration routes for each span in dependence upon the bi-criteria objective function and the model; and e) determining an amount of spare capacity, additional to the working capacity, required for each span in accordance with the selected set of restoration routes; and f) adapting the network to provide the spare capacity required for each span.

* * * * *